United States Patent
Hillinger et al.

[11] 3,712,002
[45] Jan. 23, 1973

[54] SILO CONTAINER RESPECTIVELY SILO CONSTRUCTION

[75] Inventors: Bruno Hillinger, Johann Nikowitz, Michael Schwarz, all of Vienna, Austria

[73] Assignee: Waagner-Biro Aktiengesellschaft,

[22] Filed: Feb. 25, 1971

[21] Appl. No.: 118,787

[30] Foreign Application Priority Data

March 12, 1970 Austria..............................2336/70

[52] U.S. Cl. ..................52/63, 52/197, 52/222, 52/248
[51] Int. Cl...........................E04h 7/24, E04b 1/347
[58] Field of Search..........52/63, 197, 194, 192, 248; 99/235 S; 214/17 R, 17 A, 17 B, 17 C; 222/203, 202

[56] References Cited

UNITED STATES PATENTS

| | | | |
|---|---|---|---|
| 1,065,237 | 6/1913 | Graham | 52/63 |
| 1,297,379 | 3/1919 | MacDonald | 52/63 |
| 1,473,845 | 11/1923 | Gardon | 52/63 |
| 2,838,805 | 6/1958 | Shepherd | 53/197 X |

FOREIGN PATENTS OR APPLICATIONS

| | | | |
|---|---|---|---|
| 994,182 | 6/1965 | Great Britain | 52/192 |
| 1,144,162 | 3/1969 | Great Britain | 52/197 |

*Primary Examiner*—John E. Murtagh
*Attorney*—Steinberg & Blake

[57] ABSTRACT

A silo construction including an outer framework and at least a pair of upper and lower supporting rings carried by this outer framework. A container unit is provided with top and bottom components as well as with a cylindrical wall component extending therebetween. This unit is composed at least in part of a foldable sheet material. A clamping structure clamps the unit to the supporting rings.

11 Claims, 5 Drawing Figures

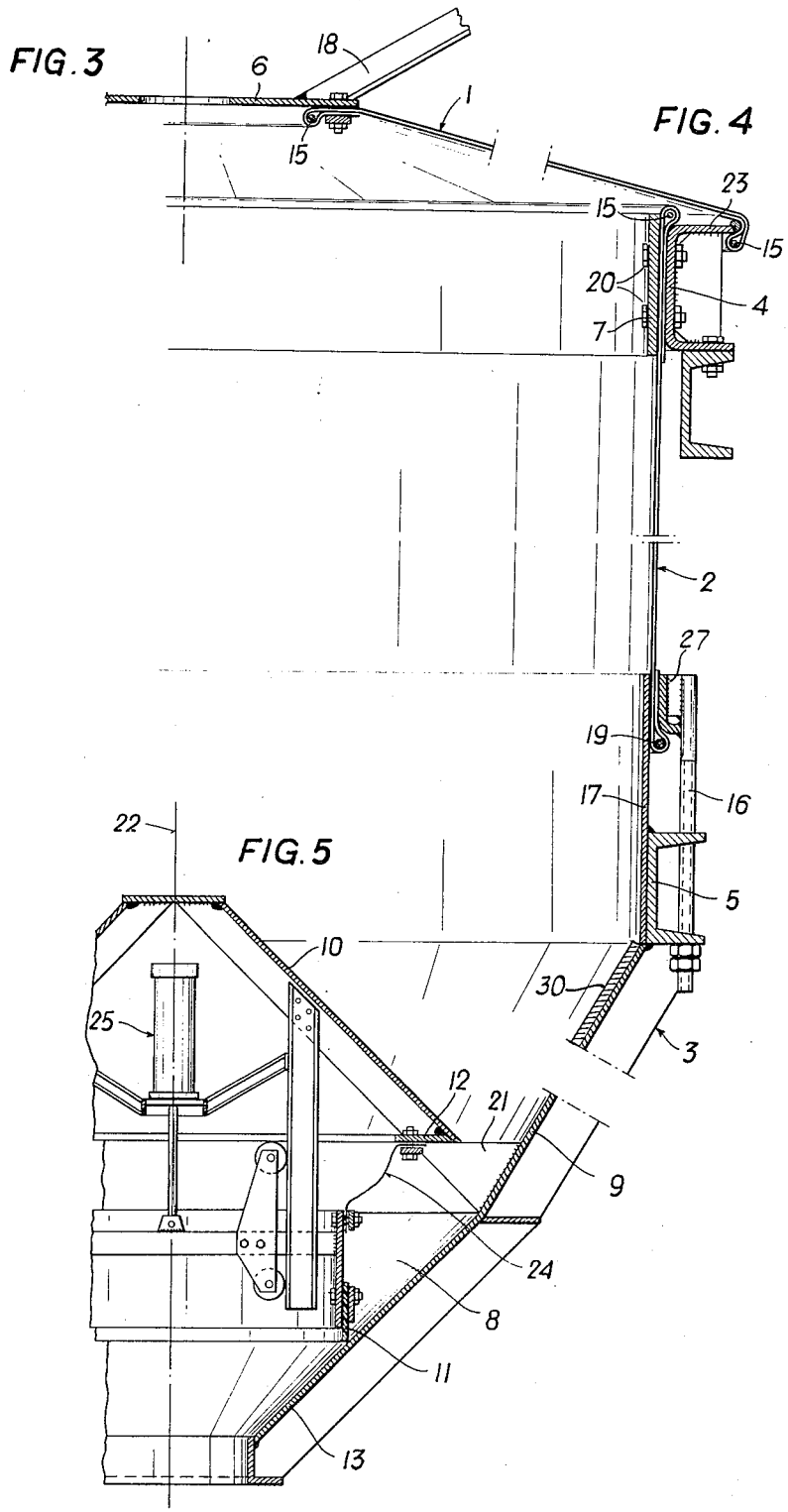

3,712,002

SILO CONTAINER RESPECTIVELY SILO CONSTRUCTION

BACKGROUND OF THE INVENTION

The present invention relates to structures for storing bulk material of all types.

In particular, the present invention relates to silos.

The present invention relates to relatively large silo installations adapted to have an interior material-holding content on the order of more than 150 cubic meters.

Modern economic conditions make it essential for many purposes that there be on hand storage space in the form of storage galleries or containers for the purpose of storing solid or liquid industrial bulk materials, such as, for example, food supplies. Most storage containers provided at the present time for this purpose are made of steel and concrete, metal, or plastic materials, such plastic materials being, for example, polyester resins reinforced with glass fibers. The manufacture of storage units of this type having a capacity on the order of 150 cubic meters and a diameter of 3,500 mm make it essential to have 60–90 percent of the construction operations at the site of the storage installation. When constructing silos made of steel and concrete approximately 90 percent of the building operations are required at the site while when using metal silos approximately 60 percent of the construction operations are required to take place at the final location of the silo. Moreover, the setting up of storage installations of this type requires a considerable amount of auxiliary structures such as scaffolding and the like as well as highly qualified personnel to carry out the individual assembly operations. The progress made during the construction operations depends to a very large degree upon weather conditions. The use of smaller transportable storage containers is not economically feasible because of the large space and material required thereby for storing large amounts of goods.

SUMMARY OF THE INVENTION

It is accordingly a primary object of the present invention to provide a silo construction which will eliminate to a very large extent the above drawbacks encountered at the present time in the construction of relatively large storage installations.

In particular, it is an object of the present invention to provide a silo construction which will enable the time required for setting up the installation to be reduced to a minimum.

Also, it is an object of the present invention to provide a silo construction which will enable the number of required highly qualified skilled personnel at the mounting of the silo to be greatly reduced.

Thus, it is among the optics of the present invention to provide a silo construction the entire cost of which per finished cubic meter of storage space can be reduced substantially below conventional costs encountered at the present time for similar installations.

According to the invention the silo construction includes an outer framework and at least a pair of supporting rings carried thereby. A container unit is composed of top and bottom components and a cylindrical wall component extending therebetween, and this unit is made up at least in part of a foldable sheet material. A clamping means is provided for clamping the container unit to the supporting rings. These rings take the form of upper and lower rings respectively situated at the regions of the upper and lower ends of the cylindrical wall component of the container unit. Preferably at least the top component and cylindrical wall component of the container unit are made of prefabricated foldable sheet material composed of a plurality of layers of woven synthetic yarns, with these components being completely finished at the manufacturing plant prior to setting up of the silo at the final site thereof.

BRIEF DESCRIPTION OF DRAWINGS

The invention is illustrated by way of example in the accompanying drawings which form part of this application and in which:

FIG. 3 schematically illustrates in a partly sectional fragmentary elevation a detail showing the connection of the top component of the container unit to a central ring which surrounds the filling opening of the silo;

FIG. 4 is a fragmentary sectional elevation schematically illustrating details of the manner in which the cylindrical wall component of the container unit and the outer periphery of the top component of the container unit are connected to supporting rings; and FIG. 5 is a fragmentary schematic sectional elevation, taken in a plane containing the central axis of the silo and illustrating the bottom end of the silo and a valve means for controlling the flow of goods out of the silo.

DESCRIPTION OF PREFERRED EMBODIMENTS

Figure 2:
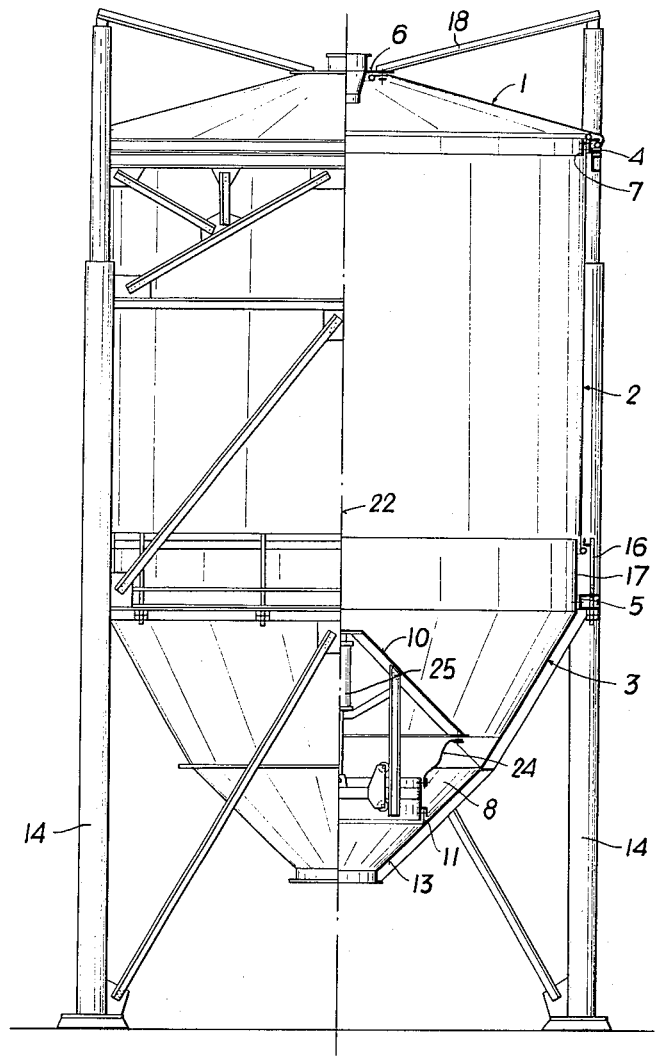
FIG. 2 is a partly sectional elevation of the silo of FIG. 1 taken along line II—II of FIG. 1.
Figure 1:
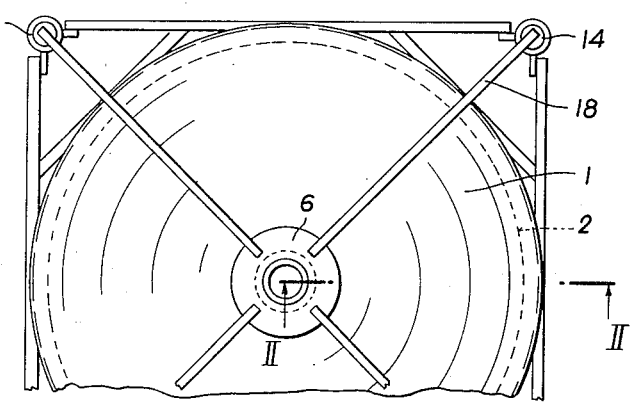
FIG. 1 is a fragmentary top plan view schematically illustrating a silo of the invention.

Referring to the drawings, there is illustrated therein a single silo installation which, if necessary, can be combined with additional individual silo installations to form a cluster of the individual installations.

The illustrated silo construction includes a container unit made up of a top or roof component 1, a cylindrical wall component 2, and a bottom or floor component 3. The bottom component 3 of the container unit forms the silo outlet 8. A particular feature of the structure of the invention resides in the fact that the top component 1 as well as the cylindrical wall component 2 are completely finished at a manufacturing plant, so that they are entirely prefabricated. These components are made of a foldable or collapsible synthetic sheet material such as, for example, a high-strength Trevira woven fabric. In accordance with the particular requirements of a given installation this fabric can be provided with a suitable coating on one side only or on both sides. The three components 1–3 of the container unit are interconnected with each other and carried by a pair of supporting rings 4 and 5 which in turn are carried by an outer steel framework 14 on which these rings 4 and 5 are hung. The connection of the cylindrical wall component 2 and the bottom component 3 of the silo is brought about by way of a cylindrical tubular guiding portion 17 of the lower supporting ring 5, this portion 17 being fixed to and extending upwardly from the remainder of the ring 5. As is apparent from FIG. 4, the lower end of the cylindrical wall component 2 surrounds and is in overlapping relation with respect to the tubular guide portion 17 of the lower ring 5, and a clamping ring 27 surrounds the lower end of the cylindrical wall component 2. Tensioning screws 16 extend through in openings of the outer flanges of the ring 5 and are fixed to the clamping ring 27 to adjust the elevation thereof and thus adjust the tension on the cylindrical wall component 2 so as to compensate for different degrees of axial stretching of the cylindrical wall component 2. Thus, it will be seen that the threaded portions of the tensioning screws 16 carry nuts below the bottom flange of ring 5 for displacing the screws 16 with respect to the ring 5 so as to adjust the tension of the cylindrical wall component 2.

A clamping means is provided for clamping the cylindrical wall component 2 to each of the supporting rings 4 and 5. Thus, the upper end of the cylindrical wall component 2 is clamped between a clamping ring 7 of the clamping means and the upper ring 4, while the lower end of the cylindrical wall component 2 is clamped between the clamping ring 27 of the clamping means and the tubular guide extension 17 of the lower ring 5. At each of its ends the fabric of the cylindrical wall component 2 is folded back upon itself to form upper and lower annular loops. An elongated elastic body of filler material is situated within and fills each of these loops, this filler material taking the form, for example, of a hemp rope 15 shown in the upper loop or the form of a curved elastic tube 19 shown in the lower loop. This structure provides the cylindrical wall component 2 with upper and lower annular bulges so that the upper bulge can become situated in the groove which forms between the curved upper flange 23 of the upper supporting ring 4 and the upper clamping ring 7 while the lower bulge becomes situated between the tubular guiding portion 17 of the lower ring 5 and the clamping ring 27 also in a groove formed between these parts. The cylindrical wall component 2 may be formed of a plurality of layers of the sheet material between which one or more layers of a compressible material such as strips of felt are located, and these intermediate layers of compressible material are situated at least at the region of the clamping rings so that in this way damaging of the synthetic yarns by compression thereof is avoided. Moreover, the situation of the layer of compressible material between fabric layers of the cylindrical wall component 2 assures a tight sealing of the interior of the silo from the outer atmosphere through the wall 2. The upper clamping ring 7 and the upper supporting ring 4 are interconnected by way of a plurality of rows of screws 20. Two of these rows are illustrated at the upper portion of FIG. 4. One of the rows of screws 20 is offset with respect to the other.

As was indicated above, the top component 1 of the container unit of the silo of the invention is also made of a foldable sheet material. This top component 1 is of the tapered, frustoconical configuration illustrated in the drawings. The top component 1 is connected with the upper supporting ring 4 by pulling the outer periphery of the top component 1 around the upper outer peripheral edge of the supporting ring 4. The bottom end of the top component 1 is also folded back upon itself to form an annular loop at the lower, larger end of the top component 1. This loop is also filled by an elongated flexible component such as a rope 15. Suitable tensioning screws or the like are connected to ends of the rope 15 at the bottom end of the top component 1, where these ends project through an opening in the lower annular loop, and by way of such tensioning screws the rope 15 at the bottom end of the top component 1 is pulled so as to be placed under tension and so as to draw the lower peripheral edge of the top component 1 inwardly under the outer peripheral edge of the flange 23, with the diameter of the bottom end of the top component 1 becoming smaller as this bottom end of the top component 1 is circumferentially pulled inwardly toward the axis of the silo, so that in this way the top component 1 is tightly connected with the ring 4. Moreover, it will be seen that because of the flexible characteristics of the top component 1 it will automatically follow any irregularities in the configuration of the outer edge of the top flange 23 of the upper ring 4, so that the top component 1 will automatically conform exactly to the configuration of the supporting ring 4 in order to form a tight connection therewith.

The top component 1 is formed at its central region with a filling opening, and at this filling opening the structure of the invention includes a ring 6 which directly surrounds the space through which material may be supplied to the interior of the container unit 1–3. For example, pneumatic pipes or the like may communicate through the opening surrounded by the ring 6 with the interior of the silo to deliver material thereto. Such a pipe along which material is transported pneumatically may be fixed directly to the ring 6. The ring 6 is itself directly supported and carried by struts or beams 18 of the outer framework 14, and the top component 1 is clamped to the ring 6. Thus, as indicated in FIG. 3, a lower clamping ring may be situated beneath the ring 6 to clamp the inner peripheral edge of the top component 1 directly to the ring 6 at the lower surface of the latter. For this purpose the inner peripheral edge of the top component 1 is also folded back upon itself to form a circular loop in which a rope 15 is located to provide the central opening of the top component 1 with an annular bulge received in the groove which forms between the ring 6 and the lower clamping ring which clamps the inner periphery of the top component 1 to the ring 6.

Thus, by way of the pair of upper and lower supporting rings 4 and 5 as well as the ring 6 the container unit 1–3 is suspended from the outer framework 14 which preferably made up of prefabricated steel parts which are assembled by suitable bolts or the like at the site where the silo is set up. Where piles are used as a foundation to support the silo construction, the lower supporting ring 5 can be directly carried by top ends of the piles which are elongated so as to extend up to the required elevation for this purpose.

The simplest embodiment of the lower or bottom component 3 of the container unit of the silo construction is one where this bottom component 3 is itself composed of a foldable sheet material in the same way as the cylindrical wall component 2. Such a bottom component 3 is fixed in any suitable way to the lower supporting ring 5.

However, as is illustrated in FIGS. 2 and 5, it is also possible to provide a bottom component 3 of frustoconical configuration so as to make it possible to provide for an easy discharge of bulk goods which flows with difficulty and which has an inclination toward bridging, such as, for example, moist sand. For this purpose the bottom component 3 is made of metal and takes the form of an outer frustoconical element 9 which has its larger upper end fixed directly to the lower supporting ring 5. This tapering component 9 surrounds and is spaced from an inner frustoconical element 10 which has a lower end larger than its upper end so that the inner member 10 is inclined in a manner which is the reverse of the inclination of the tapered member 9. The space or gap defined between the larger end 12 of the inner member 10 and the member 9 forms an annular outlet 8 through which the stored material can be discharged out of the silo. In order to interconnect the inner member 10 with the outer member 9 as well as to support the inner member 10 connecting elements 21 are circumferentially distributed along the gap between members 9 and 10, these connecting elements 21 extending radially and being fixed at their inner ends to the bottom end 12 of inner member 10 and at their outer ends to the inner surface of member 9.

Also, as is indicated in FIG. 4, it is possible to line the interior of component 3 with a covering 30 in the form of a woven sheet material made of synthetic yarn and having a frustoconical configuration, so that the entire inner surface of the bottom component is formed of a plastic. The covering 30 which is made of a woven sheet material consisting of synthetic or plastic yarn may simply be placed against the outer wall of bottom component 3 or may be adhered thereto with any suitable adhesive.

The flow of the goods out through the annular outlet 8 is controlled by a valve means 11 which includes a closure ring which in its closing position directly engages the inner surface of the tapered, funnel-shaped outlet element 13 which is fixed to and extends downwardly from the member 9. A hydraulic cylinder-and-piston assembly 25 is fixed through suitable connecting components to the valve 11 for raising and lowering the latter, the hydraulic liquid being delivered to and from the hydraulic control 25 in any suitable way. This hydraulic unit 25 is supported on members carried by extensions of the connecting elements 21 which extend along the inner surface of the inner tapered member 10. Also, as is schematically shown in FIG. 5, suitable guides extend downwardly from member 10 and are engaged by guide rollers carried by brackets fixed to the elements which serve to interconnect the piston rod of assembly 25 with the annular valve means 11. A bellows or tubular flexible sheet 24 made of a densely woven fabric is fixed on the one hand to the base 12 of inner member 10 and on the other hand to the valve ring 11 so as to prevent the entrance of air and moisture into the silo. Thus, the hydraulic control 25 can be actuated to raise the valve means 11 from its illustrated closed position in order to discharge goods while this valve means 11 can be returned to its illustrated lower closed position engaging the funnel-shaped outlet 13 in order to close the outlet 8. The funnel-shaped element 13 is formed with a central discharge opening. Thus, the goods which are to be discharged will collect in the funnel 13 to discharge out of the central opening thereof. As a result of this construction it is possible to provide large and thus economical discharge rates of flow for the stored materials, and at the same time the formation of bridges of the stored material within the bottom closure assembly is reliably avoided.

The prefabricated silo components occupy only a small volume when they are transported, so that they can be transported to the construction site at a low cost. The assembly and mounting of the silo elements into the finished silo construction requires only 20-30 percent of the assembly and mounting time previously required for silos of similar size. A further advantage of the silo construction of the invention resides in the ease with which it can be dismounted, so that the silo construction of the invention can be easily and quickly dismantled and again set up at another location. The operations which are performed at the mounting site, such as the setting up of the simple steel outer framework 14, the bolting of the pair of supporting rings 4 and 5 as well as the assembly of the bottom component 3 can be carried out by unskilled labor under the supervision of one or two experts. The setting up of the silo construction of the invention takes place without any scaffolding, inasmuch as the steel outer frame-work 14 itself serves as a scaffold and the assembly of the entire silo can take place from the ground because initially the top component 1 is assembled at ground level with the upper supporting ring 4. After raising this latter assembly the cylindrical wall component 2 is mounted so that it is connected with and extends downwardly from the upper ring 4 and thereafter the lower supporting ring 5 and the bottom component 3 are assembled.

The cylindrical wall component 2 which is manufactured from a circularly woven tube of synthetic yarns is coated at the manufacturing plant with a suitable resistant material in accordance with the requirements which are expected to be encountered during use of the silo. The circular yarn which surrounds the axis of the cylindrical wall component 2 is made of a fully drawn synthetic yarn, in particular a preliminarily drawn yarn. The axially extending yarn which is normal to the circumferential yarn and extends parallel to the central silo axis 22 is interwoven with the circumferential yarn so that each axial yarn portion extends half-way around each intersecting circumferential yarn portion. Thus the axially extending yarn will interconnect the individual circumferential extending yarn portion and the axially extending yarn is not fully drawn. In this way circumferential stretching of the circumferentially extending yarn, stressed by forces perpendicular to and extending radially from the central silo axis 22, is substantially less than the longitudinal stretching of the axial yarn in a direction parallel to the silo axis. In the event that the stored bulk material forms bridges in the interior of the silo, the increase in the vertical frictional forces at the cylindrical silo wall result in localized stretching thereof, bringing about in this way caving in and collapse of any bridges of material which may happen to form. This action results in a further advantage in that the forces which by reason of the frictional engagement of the stored material with the cylindrical wall 2 are transmitted to the upper supporting ring 4 are substantially less than in the case of a rigid silo wall so that the outer framework 14 has a much more favorable static load with the construction of the invention than with conventional silos which have rigid walls.

What is claimed is:

1. In a silo construction, an outer framework, at least a pair of supporting rings carried by said outer framework, a container unit having top and bottom components and a cylindrical wall component extending therebetween, said unit being composed at least in part of a foldable sheet material, and clamping means clamping said unit to said rings, said cylindrical wall component of said container unit having upper and lower ends, and said rings being respectively situated at the regions of said upper and lower ends of said cylindrical wall component, said cylindrical wall component being composed in its entirety of a flexible fabric sheet material, and said clamping means clamping the latter sheet material to said rings with said sheet material being tensioned between said rings by the action of said clamping means.

2. The combination of claim 1 and wherein at least said top and cylindrical wall components of said container unit are prefabricated and in the form of a foldable coated sheet material made up of woven synthetic yarns, and said cylindrical wall component being a seamless tube.

3. The combination of claim 2 and wherein said cylindrical wall component has a central axis and includes circumferentially extending yarn surrounding said axis and axially extending yarn interwoven with said circumferentially extending yarn with each axially extending yarn portion extending approximately half way around each intersecting circumferentially extending yarn portion, said circumferentially extending yarn being drawn and being strong enough to withstand the expected silo stresses while providing for the cylindrical wall component a capacity for circumferential elongation which is substantially less than its capacity for axial elongation.

4. The combination of claim 1 and wherein said bottom component of said container unit includes a woven sheet material made of synthetic yarn and having a frustoconical configuration, said supporting rings including a lower supporting ring to which said bottom component is fixed.

5. The combination of claim 1 and wherein said bottom component has a frustoconical configuration and opposed upper and lower ends with said upper end being larger than its lower end, one of said supporting rings being a lower supporting ring to which the larger end of said bottom component is fixed, an inner frustoconical member surrounded by and spaced from said bottom component to form an annular gap therewith, said inner member having upper and lower ends with said lower end being larger than said upper end thereof, and a plurality of radially extending connecting members distributed circumferentially along said gap and fixing said frusto-conical members to each other, said gap forming an annular outlet, a tapered substantially funnel-shaped member fixed to and extending downwardly from the smaller end of said bottom component to receive material flowing through said outlet, and annular valve means situated in the region of said outlet for closing and opening the same.

6. The combination of claim 1 and wherein said top component of said container unit is formed with a central filling opening, and a ring clamped to said top component at said filling opening thereof, said ring being carried by said outer framework.

7. In a silo construction, an outer framework, at least a pair of supporting rings carried by said outer framework, a container unit having top and bottom components and a cylindrical wall component extending therebetween, said unit being composed at least in part of a foldable sheet material, and clamping means clamping said unit to said rings, said cylindrical wall component of said unit being composed of said foldable sheet material and having an upper end folded back upon itself to form an annular loop at the upper end of said cylindrical wall component, an elongated elastic body of foldable material situated in the interior of said loop to form an annular yieldable bulging portion at the upper end of said cylindrical wall component, said clamping means including a clamping ring clamping said upper end of said cylindrical wall component to an upper one of said supporting rings, the latter ring forming with said clamping ring a groove which receives said annular bulging portion at the upper end of said cylindrical wall component.

8. In a silo construction, an outer framework, at least a pair of supporting rings carried by said outer framework, a container unit having top and bottom components and a cylindrical wall component extending therebetween, said unit being composed at least in part of a foldable sheet material, and clamping means clamping said unit to said rings, said supporting rings including a lower supporting ring situated adjacent a lower end of said cylindrical wall component of said unit, said clamping means including a clamping ring clamping said lower end of said cylindrical wall component to said lower supporting ring, and means operatively connected with said clamping ring for shifting the latter.

9. The combination of claim 6 and wherein said cylindrical wall component is made of the foldable sheet material and is folded back upon itself at its lower end to form an annular loop at the lower end of said cylindrical wall component, an elongated body of filler material situated in said loop to provide said cylindrical wall component with an annular bulging portion at its lower end, and the latter bulging portion of said cylindrical wall component being situated between the lower supporting ring and said shiftable clamping ring.

10. The combination of claim 5 and wherein two rows of screws to connect said upper supporting ring and said clamping ring for clamping said upper end of said cylindrical wall component therebetween, one of said rows being offset with respect to the other, and said cylindrical wall component being composed at least at said upper end thereof which is clamped between said clamping ring and upper supporting ring of a plurality of layers of sheet material with at least one layer of compressible sheet material situated therebetween.

11. In a silo construction, an outer framework, at least a pair of supporting rings carried by said outer framework, a container unit having top and bottom components and a cylindrical wall component extending therebetween, said unit being composed at least in part of a foldable sheet material, and clamping means clamping said unit to said rings, one of said supporting rings being a lower ring, said bottom component of said unit being made of a substantially rigid, self-sustaining material and being fixed to said lower supporting ring, said lower supporting ring having a tubular guide portion extending into overlapping relation with respect to a lower end of said cylindrical wall component, said clamping means including a clamping ring clamping said lower end of said cylindrical wall component to said guide portion of said lower ring, and tensioning screws coacting with said clamping ring for adjusting the position thereof along said guide portion of said lower supporting ring for tensioning said cylindrical wall component.

* * * * *